US012689131B2

(12) United States Patent
Wu et al.

(10) Patent No.: US 12,689,131 B2
(45) Date of Patent: Jul. 21, 2026

(54) COMMUNICATION DEVICE AND COMMUNICATION METHOD

(71) Applicant: HTC Corporation, Taoyuan City (TW)

(72) Inventors: Chun-Yih Wu, Taoyuan City (TW); Ta-Chun Pu, Taoyuan City (TW); Yen-Liang Kuo, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 44 days.

(21) Appl. No.: 19/014,443

(22) Filed: Jan. 9, 2025

(65) Prior Publication Data

US 2026/0155576 A1 Jun. 4, 2026

(30) Foreign Application Priority Data

Dec. 3, 2024 (TW) ................................ 113146698

(51) Int. Cl.
*H01Q 15/00* (2006.01)
*H01Q 5/28* (2015.01)

(52) U.S. Cl.
CPC .......... *H01Q 15/0013* (2013.01); *H01Q 5/28* (2015.01)

(58) Field of Classification Search
CPC ....... H01Q 15/00; H01Q 15/0013; H01Q 5/28
See application file for complete search history.

(56) References Cited

FOREIGN PATENT DOCUMENTS

| | | | | | |
|---|---|---|---|---|---|
| CN | 110416739 | A | * | 11/2019 | ........... H01Q 1/2266 |
| CN | 116683191 | A | * | 9/2023 | ............... H01Q 3/36 |
| CN | 118336375 | A | * | 7/2024 | ............. H01Q 1/241 |

* cited by examiner

*Primary Examiner* — Hoang V Nguyen
(74) *Attorney, Agent, or Firm* — Birch, Stewart, Kolasch & Birch, LLP

(57) ABSTRACT

A communication device includes a first FSS (Frequency Selective Surface) element, a second FSS element, a feeding radiation element, and at least one DLA (Dielectric Laser Accelerator). The second FFS element is adjacent to the first FSS element. The feeding radiation element generates an electromagnetic signal. The electromagnetic signal is propagated by using the first FSS element and the second FSS element. The DLA transmits at least one electron beam. An antenna structure is formed by the first FSS element, the second FSS element, and the feeding radiation element. A coupling effect is induced between the electron beam and the electromagnetic signal, such that the radiation energy of the electromagnetic signal is enhanced.

20 Claims, 5 Drawing Sheets

COMMUNICATION DEVICE AND COMMUNICATION METHOD

CROSS REFERENCE TO RELATED APPLICATIONS

This application claims priority of Taiwan Patent Application No. 113146698 filed on Dec. 3, 2024, the entirety of which is incorporated by reference herein.

BACKGROUND OF THE INVENTION

Field of the Invention

The invention relates to a communication device, and more particularly, to a communication device with high radiation gain.

Description of the Related Art

In the NTN (Non-Terrestrial Networks) architecture of 5G and 6G, satellites and high-altitude platform systems are important components that compensate for conventional terrestrial mobile networks. Satellites in GSO (Geosynchronous Orbit) maintain fixed positions above the Earth, and they are mainly used for broadcasting and fixed communications. MEO (Medium Earth Orbit) satellites, such as those used for GPS (Global Positioning System) and Galileo, are located at intermediate orbital altitudes. LEO (Low Earth Orbit) satellites, such as the Starlink system of SpaceX, provide high-speed communications over short distances with shorter delay. In addition, although HAPS (High Altitude Platform Stations) are not satellites, they fill the gap in communication coverage between the ground and satellites, and are used as communication platforms flying in the atmosphere. A common feature, regardless of whether it is GSO, MEO, LEO satellites or HAPS, is the requirement for communication across long distances. Such long-distance communication requires amplifiers with high power and high efficiency, so as to ensure good signal strength and signal quality. SSPA (Solid State Power Amplifier) and TWTA (Traveling Wave Tube Amplifier) are two types of amplifiers that are commonly used in the applications described above. SSPA is characterized by its solid-state design. TWTA is characterized by its high power output. As more communications are requested, the performance and efficiency of these amplifiers can become important issues of research and development efforts.

In addition, array antennas, also known as phased array antennas, are particularly useful for satellites and HAPS communications because of their ability to electronically scan and form directional beams. The design of these antennas allows users to quickly and flexibly adjust their beam direction in response to dynamic communication environments and other requirements.

Therefore, the further optimization of high-performance SSPA and TWTA, as well as the integration and development of array antennas, will become essential issues of non-terrestrial networks in the future.

BRIEF SUMMARY OF THE INVENTION

In an exemplary embodiment, the invention is directed to a communication device that includes a first FSS (Frequency Selective Surface) element, a second FSS element, a feeding radiation element, and at least one DLA (Dielectric Laser Accelerator). The second FFS element is adjacent to the first FSS element. The feeding radiation element generates an electromagnetic signal. The electromagnetic signal is propagated by using the first FSS element and the second FSS element. The DLA transmits at least one electron beam. An antenna structure is formed by the first FSS element, the second FSS element, and the feeding radiation element. A coupling effect is induced between the electron beam and the electromagnetic signal, such that the radiation energy of the electromagnetic signal is enhanced.

In some embodiments, the first FSS element is configured to partially reflect and partially transmit the electromagnetic signal.

In some embodiments, the second FSS element is configured to completely reflect the electromagnetic signal.

In some embodiments, the second FSS element is made of an AMC (Artificial Magnetic Conductor) material.

In some embodiments, the second FSS element is made of a metal material.

In some embodiments, the DLA is disposed between the first FSS element and the second FSS element.

In some embodiments, the antenna structure covers an operational frequency band from 60 GHz to 500 GHz.

In some embodiments, the specific distance between the first FSS element and the second FSS element is substantially equal to 0.25 wavelength of the operational frequency band.

In some embodiments, the specific distance between the first FSS element and the second FSS element is substantially equal to 0.5 wavelength of the operational frequency band.

In some embodiments, the communication device further includes a plurality of DLAs for transmitting a plurality of electron beams.

In some embodiments, the electron beams have the same transmission direction.

In some embodiments, the electron beams have different transmission directions.

In some embodiments, the DLAs are arranged to form an array.

In some embodiments, the DLAs are arranged along a loop.

In some embodiments, the loop substantially has a circular shape or an elliptical shape.

In some embodiments, the communication device further includes a metal waveguide disposed below the second FSS element.

In another exemplary embodiment, the invention is directed to a communication method that includes the steps of: generating an electromagnetic signal by a feeding radiation element; using a first FSS (Frequency Selective Surface) element and a second FSS element to propagate the electromagnetic wave, wherein the second FSS element is disposed adjacent to the first FSS element, and wherein an antenna structure is formed by the first FSS element, the second FSS element, and the feeding radiation element; and transmitting at least one electron beam by at least one DLA, wherein a coupling effect is induced between the electron beam and the electromagnetic signal, such that the radiation energy of the electromagnetic signal is enhanced.

In some embodiments, the communication method further includes: transmitting a plurality of electron beams by a plurality of DLAs.

In some embodiments, the communication method further includes: arranging the DLAs to form an array.

In some embodiments, the communication method further includes: arranging the DLAs along a loop.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
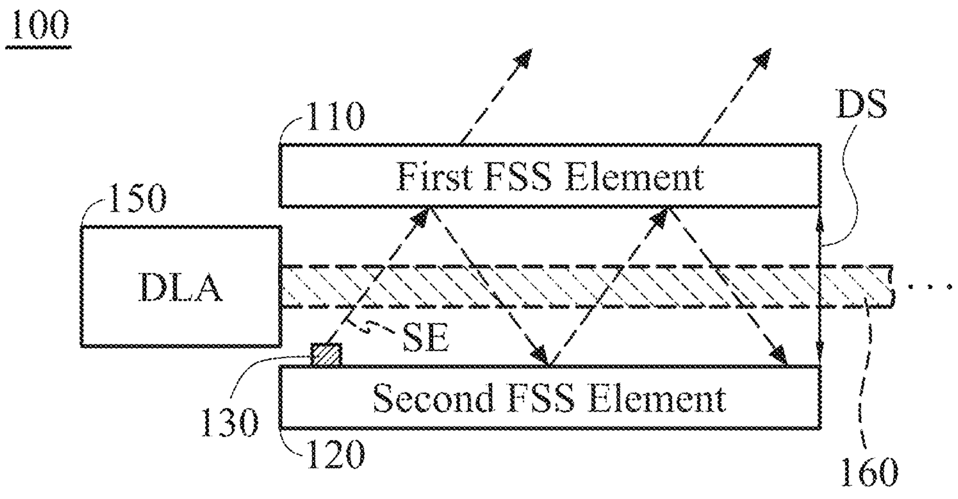
FIG. 1 is a diagram of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a communication device 100 according to an embodiment of the invention. For example, the communication device 100 may be a wireless access point, a wearable device, a smart phone, a tablet computer, or a notebook computer. Alternatively, the communication device 100 may be any unit operating within the Internet of Things (IOT), but it is not limited thereto.

In the embodiment of FIG. 1, the communication device 100 includes a first FSS (Frequency Selective Surface) element 110, a second FSS element 120, a feeding radiation element 130, and a DLA (Dielectric Laser Accelerator) 150. It should be understood that the communication device 100 may further include other components, such as a processor, a power supply module, and/or a housing, although they are not displayed in FIG. 1.

The second FSS element 120 is disposed adjacent to the first FSS element 110. The first FSS element 110 and the second FSS element 120 may be substantially parallel to each other. For example, the first FSS element 110 may be a PRS (Partially Reflective Surface) element. The second FSS element 120 may be made of an AMC (Artificial Magnetic Conductor) material. Alternative, the second FSS element 120 may be made of a metal material. It should be noted that the term "adjacent" or "close" over the disclosure means that the distance (spacing) between two corresponding elements is shorter than a predetermined distance (e.g., 10 mm or shorter), but often does not mean that the two corresponding elements are touching each other directly (i.e., the aforementioned distance/spacing therebetween is reduced to 0).

The feeding radiation element 130 is configured to generate an electromagnetic signal SE. Also, the feeding radiation element 130 may be coupled to a signal source (not shown). The shapes and types of the feeding radiation element 130 are not limited in the invention. For example, the feeding radiation element 130 may be implemented with a slot antenna, a patch antenna, a monopole antenna, a dipole antenna, a loop antenna, or a PIFA (Planar Inverted F Antenna).

The electromagnetic signal SE is propagated by using the first FSS element 110 and the second FSS element 120. For example, the first FSS element 110 may be configured to partially reflect and partially transmit the electromagnetic signal SE, and the second FSS element 120 may be configured to completely reflect the electromagnetic signal SE. In a preferred embodiment, an antenna structure of the communication device 100 is formed by the first FSS element 110, the second FSS element 120, and the feeding radiation element 130. The antenna structure of the communication device 100 can provide relatively high radiation gain because the electromagnetic signal SE results in constructive interference around the first FSS element 110.

In some embodiments, the antenna structure of the communication device 100 covers an operational frequency band from 60 GHz to 500 GHz, so as to support the wideband operations of mmWave (Millimeter Wave). However, the invention is not limited thereto. In alternative embodiments, the antenna structure of the communication device 100 can also support the wideband operations of THz (Terahertz).

In order to enhance the aforementioned constructive interference, the specific distance DS between the first FSS element 110 and the second FSS element 120 can be appropriately designed. For example, if the second FSS element 120 is made of the AMC material, the specific distance DS may be substantially equal to 0.25 wavelength (λ/4) of the operational frequency band of the antenna structure of the communication device 100. Alternatively, if the second FSS element 120 is made of the metal material, the specific distance DS may be substantially equal to 0.5 wavelength (λ/2) of the operational frequency band of the antenna structure of the communication device 100. In some embodiments, each of the first FSS element 110 and the second FSS element 120 is implemented with a multi-layer structure. In some embodiments, the length of each of the first FSS element 110 and the second FSS element 120 is longer than or equal to 10 wavelengths (10λ) of the operational frequency band of the antenna structure of the communication device 100. In some embodiments, the width of each of the first FSS element 110 and the second FSS element 120 is longer than or equal to 10 wavelengths (10λ) of the operational frequency band of the antenna structure of the communication device 100. In addition, the aforementioned specific distance DS may be substantially equal to 0.1 wavelength (λ/10) of the operational frequency band of the antenna structure of the communication device 100.

In some embodiments, the DLA 150 is disposed between the first FSS element 110 and the second FSS element 120. The DLA 150 is configured to transmitting an electron beam 160. The transmission direction of the electron beam 160 may be substantially parallel to both of the first FSS element 110 and the second FSS element 120, but it is not limited thereto. The electron beam 160 appears between the first FSS element 110 and the second FSS element 120. The electron beam 160 interacts with the electromagnetic signal SE. Generally, a coupling effect is induced between the electron beam 160 and the electromagnetic signal SE, such that the radiation energy of the electromagnetic signal SE is enhanced. With such a design, the radiation gain of the antenna structure of the communication device 100 can be significantly increased since partial energy of the first electron beam 160 is transferred to the electromagnetic signal SE and it is used to compensate for the propagation attenuation of the electromagnetic signal SE. It should be noted that in comparison to a conventional electron gun, the overall size of the proposed DLA 150 is much smaller. In addition, the overall manufacturing cost of the communication device 100 of the invention can be significantly reduced because the proposed DLA 150 is easily integrated with the antenna structure of the communication device 100 on a single silicon substrate (not shown).

In some embodiments, the communication device 100 further includes a multi-beam aperture board (not shown), which is disposed adjacent to the DLA 150. The multi-beam aperture board is configured to divide the electron beam 160 into a plurality of small beams. The small beams may have different transmission directions. For example, the multi-beam aperture board may have a plurality of openings, and the diameter of each opening may be smaller than or equal to 100 μm, but it is not limited thereto.

The following embodiments will introduce different configurations and detail structural features of the communication device 100. It should be understood that these figures and descriptions are merely exemplary, rather than limitations of the invention.

Figure 2:
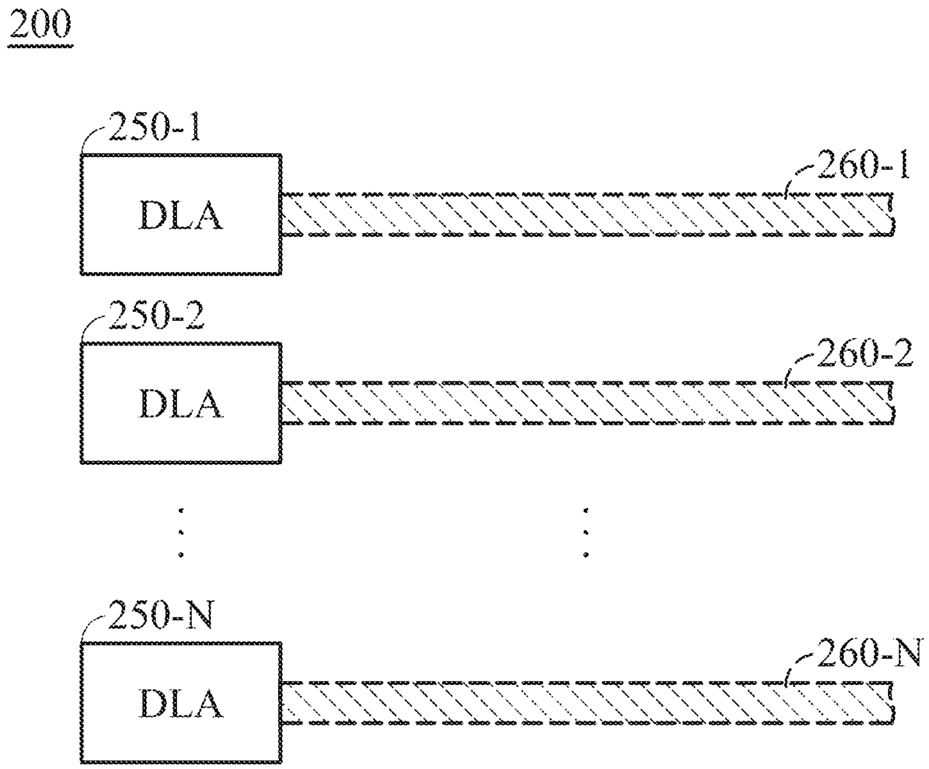
FIG. 2 is a diagram of a communication device according to an embodiment of the invention.

FIG. 2 is a diagram of a communication device 200 according to an embodiment of the invention. FIG. 2 is similar to FIG. 1. In the embodiment of FIG. 2, the communication device 200 at least includes a plurality of DLAs 250-1, 250-2, . . . , and 250-N, where "N" is any integer greater than or equal to 2. To simplify the figure, the other elements of communication device 200 are not displayed in FIG. 2. The DLAs 250-1, 250-2, . . . , and 250-N are configured to transmit a plurality of electron beams 260-1, 260-2, . . . , and 260-N. It should be noted that The DLAs 250-1, 250-2, . . . , and 250-N are arranged to form an array, and the electron beams 260-1, 260-2, . . . , and 260-N have the same transmission direction. According to practical measurements, the application of more electron beams can help to further enhance the radiation gain of an antenna structure of the communication device 200. However, the invention is not limited thereto. In alternative embodiments, the shape and the dimension of the array composed of the DLAs 250-1, 250-2, . . . , and 250-N are adjustable according to different requirements. Other features of the communication device 200 of FIG. 2 are similar to those of the communication device 100 of FIG. 1. Thus, the two embodiments can achieve similar levels of performance.

Figure 3:
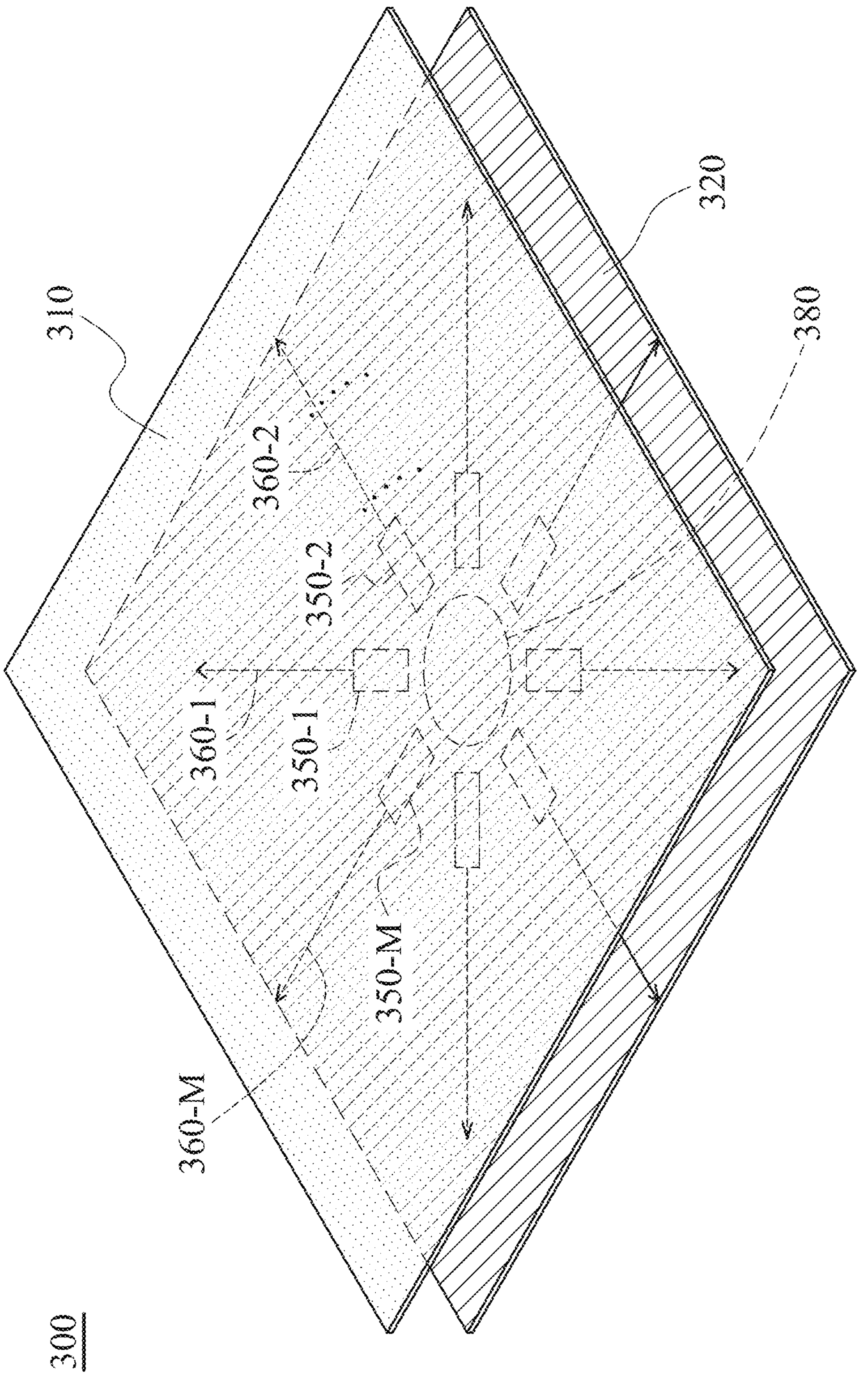
FIG. 3 is a diagram of a communication device according to an embodiment of the invention.

FIG. 3 is a diagram of a communication device 300 according to an embodiment of the invention. FIG. 3 is similar to FIG. 1. In the embodiment of FIG. 3, the communication device 300 at least includes a first FSS element 310, a second FSS element 320, and a plurality of DLAs 350-1, 350-2, . . . , and 350-M, where "M" is any integer greater than or equal to 2. To simplify the figure, the other elements of communication device 300 are not displayed in FIG. 3. The DLAs 350-1, 350-2, . . . , and 350-M are disposed between the first FSS element 310 and the second FSS element 320. The DLAs 350-1, 350-2, . . . , and 350-M are configured to transmit a plurality of electron beams 360-1, 360-2, . . . , and 360-M. It should be noted that The DLAs 350-1, 350-2, . . . , and 350-M are arranged along a virtual loop 380, and the electron beams 360-1, 360-2, . . . , and 360-M have different transmission directions. For example, the aforementioned loop 380 may substantially have a circular shape, but it is not limited thereto. According to practical measurements, the application of more electron beams can help to further enhance the radiation gain of an antenna structure of the communication device 300. Other features of the communication device 300 of FIG. 3 are similar to those of the communication device 100 of FIG. 1. Thus, the two embodiments can achieve similar levels of performance.

Figure 4:
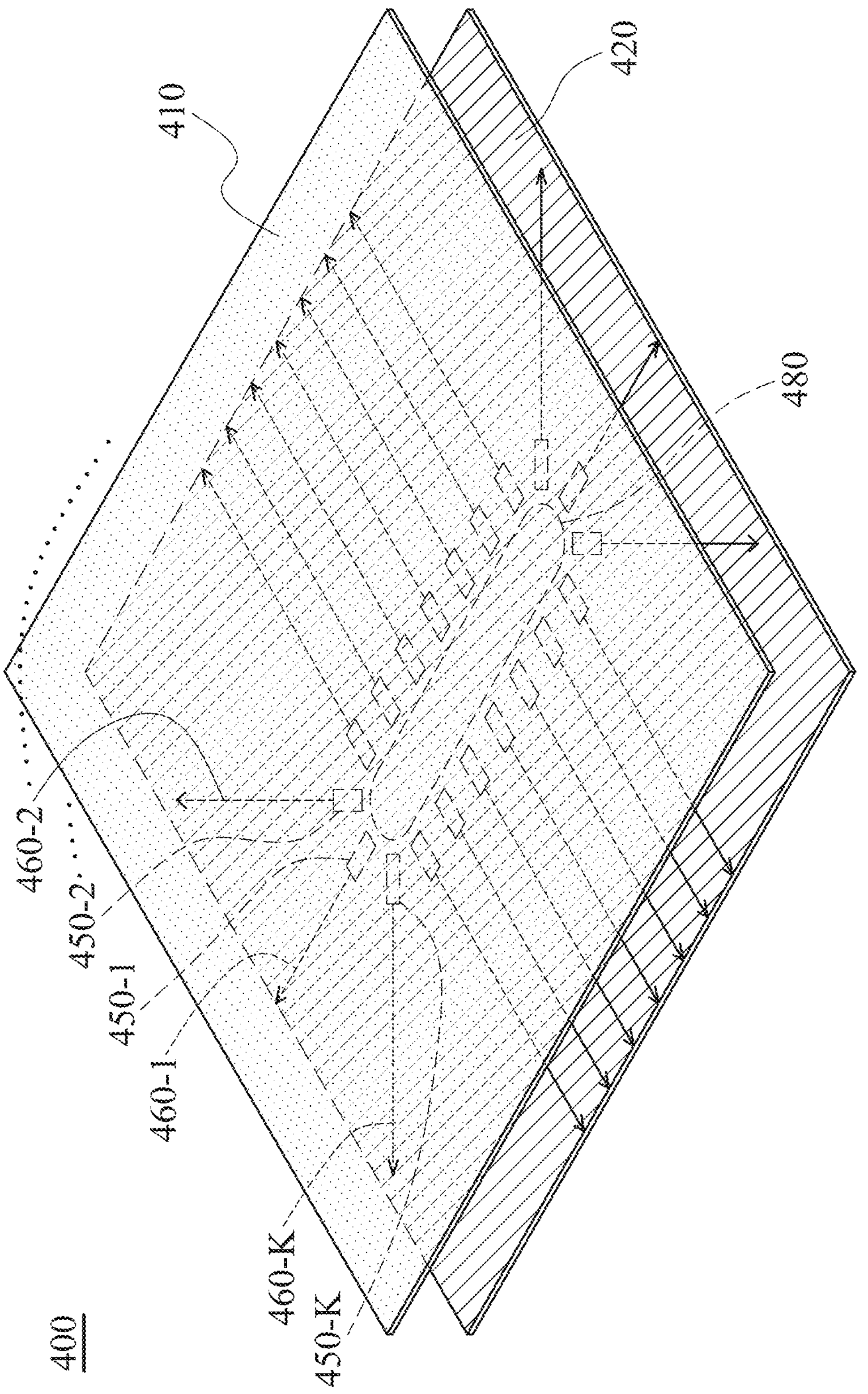
FIG. 4 is a diagram of a communication device according to an embodiment of the invention.

FIG. 4 is a diagram of a communication device 400 according to an embodiment of the invention. FIG. 4 is similar to FIG. 1. In the embodiment of FIG. 4, the communication device 400 at least includes a first FSS element 410, a second FSS element 420, and a plurality of DLAs 450-1, 450-2, . . . , and 450-K, where "K" is any integer greater than or equal to 2. To simplify the figure, the other elements of communication device 400 are not displayed in FIG. 4. The DLAs 450-1, 450-2, . . . , and 450-K are disposed between the first FSS element 410 and the second FSS element 420. The DLAs 450-1, 450-2, . . . , and 450-K are configured to transmit a plurality of electron beams 460-1, 460-2, . . . , and 460-K. It should be noted that The DLAs 450-1, 450-2, . . . , and 450-K are arranged along a virtual loop 480, and the electron beams 460-1, 460-2, . . . , and 460-K have different transmission directions. For example, the aforementioned loop 480 may substantially have an elliptical shape, but it is not limited thereto. In alternative embodiments, the aforementioned loop 480 may substantially have a square shape, a rectangular shape, a triangular shape, a diamond shape, or a trapezoidal shape.

According to practical measurements, the application of more electron beams can help to further enhance the radiation gain of an antenna structure of the communication device 400. Other features of the communication device 400 of FIG. 4 are similar to those of the communication device 100 of FIG. 1. Thus, the two embodiments can achieve similar levels of performance.

Figure 5:
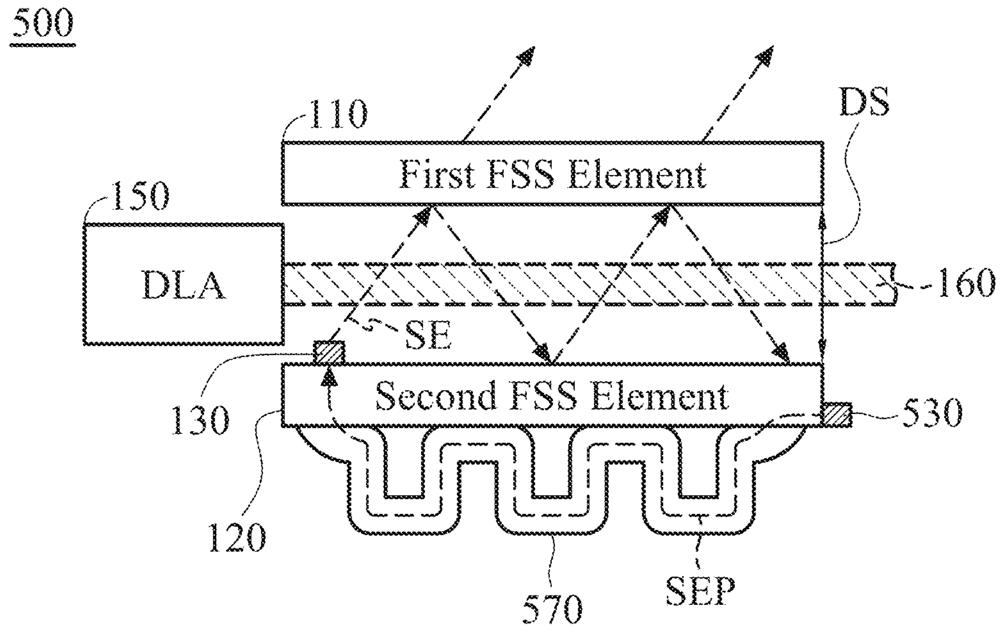
FIG. 5 is a diagram of a communication device according to an embodiment of the invention.

FIG. 5 is a diagram of a communication device 500 according to an embodiment of the invention. FIG. 5 is similar to FIG. 1. In the embodiment of FIG. 5, the communication device 500 further includes a metal waveguide 570, which is disposed below the second FSS element 120. For example, the metal waveguide 570 may substantially have a meandering shape or a W-shape, but it is not limited thereto. According to practical measurements, if the metal waveguide 570 is used together with a TWTA (Traveling Wave Tube Amplifier) (not shown), the radiation energy of the electromagnetic signal SE can be further enhanced. In alternative embodiments, the communication device 500 further includes a primary feeding radiation element 530, which is positioned at a side of the second FSS element 120. The primary feeding radiation element 530 can generate a primary electromagnetic signal SEP. Next, the primary electromagnetic signal SEP can be transmitted through the metal waveguide 570. The feeding radiation element 130 can generate the electromagnetic signal SE according to the primary electromagnetic signal SEP. With such a design, the aforementioned feeding radiation element 130 is considered as a secondary feeding radiation element corresponding to the primary feeding radiation element 530, and the aforementioned electromagnetic signal SE is considered as a secondary electromagnetic signal SE corresponding to the primary electromagnetic signal SEP. Other features of the communication device 500 of FIG. 5 are similar to those of the communication device 100 of FIG. 1. Thus, the two embodiments can achieve similar levels of performance.

Figure 6:
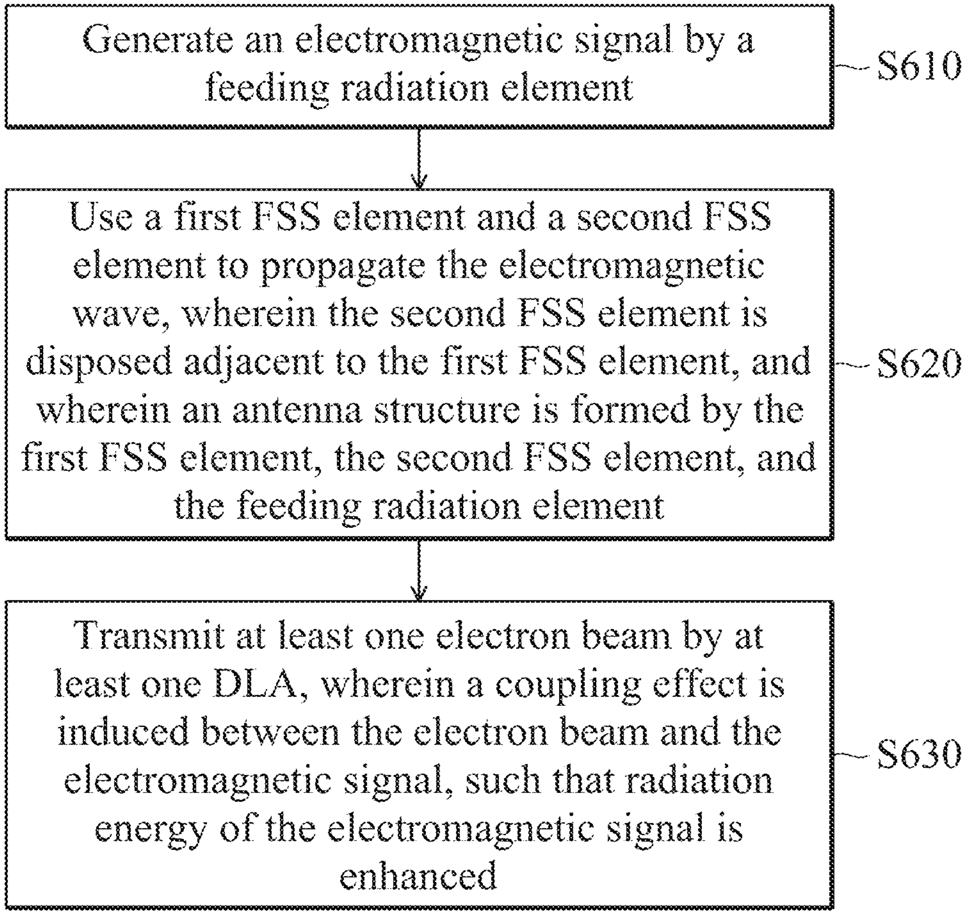
FIG. 6 is a flowchart of a communication method according to an embodiment of the invention.

FIG. 6 is a flowchart of a communication method according to an embodiment of the invention. To begin, in step S610, an electromagnetic signal is generated by a feeding radiation element. In step S620, a first FSS element and a second FSS element are used to propagate the electromagnetic wave. The second FSS element is disposed adjacent to the first FSS element. An antenna structure is formed by the first FSS element, the second FSS element, and the feeding radiation element. Finally, in step S630, at least one electron beam is transmitted by at least one DLA. A coupling effect is induced between the electron beam and the electromagnetic signal, such that the radiation energy of the electromagnetic signal is enhanced. It should be understood that these steps are not required to be performed in order, and every feature of the embodiments of FIGS. 1 to 5 may be applied to the communication method of FIG. 6.

The invention proposes a novel communication device and a novel communication method thereof. According to practical measurements, the communication device using the above design can significantly improve its overall antenna radiation gain. Therefore, the invention is suitable for application in a variety of equipment.

Note that the above element sizes are not limitations of the invention. A designer can fine-tune these setting values according to different requirements. It should be understood that the communication device and the communication method of the invention are not limited to the configurations of FIGS. 1-6. The invention may include any one or more features of any one or more embodiments of FIGS. 1-6. In other words, not all of the features displayed in the figures should be implemented in the communication device and the communication method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:

a first FSS (Frequency Selective Surface) element;

a second FSS element, disposed adjacent to the first FSS element;

a feeding radiation element, generating an electromagnetic signal, wherein the electromagnetic signal is propagated by using the first FSS element and the second FSS element; and at least one DLA (Dielectric Laser Accelerator), transmitting at least one electron beam;

wherein an antenna structure is formed by the first FSS element, the second FSS element, and the feeding radiation element;

wherein a coupling effect is induced between the electron beam and the electromagnetic signal, such that radiation energy of the electromagnetic signal is enhanced.

2. The communication device as claimed in claim 1, wherein the first FSS element is configured to partially reflect and partially transmit the electromagnetic signal.

3. The communication device as claimed in claim 1, wherein the second FSS element is configured to completely reflect the electromagnetic signal.

4. The communication device as claimed in claim 1, wherein the second FSS element is made of an AMC (Artificial Magnetic Conductor) material.

5. The communication device as claimed in claim 1, wherein the second FSS element is made of a metal material.

6. The communication device as claimed in claim 1, wherein the DLA is disposed between the first FSS element and the second FSS element.

7. The communication device as claimed in claim 1, wherein the antenna structure covers an operational frequency band from 60 GHz to 500 GHz.

8. The communication device as claimed in claim 7, wherein a specific distance between the first FSS element and the second FSS element is substantially equal to 0.25 wavelength of the operational frequency band.

9. The communication device as claimed in claim 7, wherein a specific distance between the first FSS element and the second FSS element is substantially equal to 0.5 wavelength of the operational frequency band.

10. The communication device as claimed in claim 1, further comprising:

a plurality of DLAs, transmitting a plurality of electron beams.

11. The communication device as claimed in claim 10, wherein the electron beams have a same transmission direction.

12. The communication device as claimed in claim 10, wherein the electron beams have different transmission directions.

13. The communication device as claimed in claim 10, wherein the DLAs are arranged to form an array.

14. The communication device as claimed in claim 10, wherein the DLAs are arranged along a loop.

15. The communication device as claimed in claim 14, wherein the loop substantially has a circular shape or an elliptical shape.

16. The communication device as claimed in claim 1, further comprising:

a metal waveguide, disposed below the second FSS element.

17. A communication method, comprising the steps of:

generating an electromagnetic signal by a feeding radiation element;

using a first FSS (Frequency Selective Surface) element and a second FSS element to propagate the electromagnetic wave, wherein the second FSS element is disposed adjacent to the first FSS element, and wherein an antenna structure is formed by the first FSS element, the second FSS element, and the feeding radiation element; and transmitting at least one electron beam by at least one DLA, wherein a coupling effect is induced between the electron beam and the electromagnetic signal, such that radiation energy of the electromagnetic signal is enhanced.

18. The communication method as claimed in claim 17, further comprising:

transmitting a plurality of electron beams by a plurality of DLAs.

19. The communication method as claimed in claim 18, further comprising:

arranging the DLAs to form an array.

20. The communication method as claimed in claim 18, further comprising:

arranging the DLAs along a loop.

* * * * *